(12) United States Patent
Bolaski

(10) Patent No.: US 7,322,232 B1
(45) Date of Patent: Jan. 29, 2008

(54) DIPSTICK-SHIELDING TUBE AND METHOD OF USE

(75) Inventor: Lawrence P. Bolaski, Springfield, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 700 days.

(21) Appl. No.: 10/859,388

(22) Filed: Jun. 1, 2004

Related U.S. Application Data

(60) Provisional application No. 60/473,973, filed on May 30, 2003.

(51) Int. Cl.
*G01F 23/04* (2006.01)

(52) U.S. Cl. .......................... 73/290 B; 33/722; 33/723

(58) Field of Classification Search .................. 33/722; 73/290 B
See application file for complete search history.

(56) References Cited

U.S. PATENT DOCUMENTS 4,176,457 A * 12/1979 Keffeler ....................... 33/727
4,831,877 A * 5/1989 Snow ....................... 73/290 R

* cited by examiner

*Primary Examiner*—Hezron Williams
*Assistant Examiner*—Paul M West
(74) *Attorney, Agent, or Firm*—Clifford F. Rey

(57) ABSTRACT

An automatic transmission fluid dipstick-shielding tube and method of use for shielding the terminal end of the dipstick whereon fluid level indicia are imprinted to ensure accurate measurement of the fluid level within an automatic transmission or other similar machinery is disclosed. The present dipstick-shielding tube provides a physical barrier which blocks fluid from splashing over the terminal end of the dipstick to facilitate an accurate fluid level reading. In a method of the present invention, the original equipment dipstick tube is initially removed from the transmission housing. Next, the present dipstick-shielding tube is installed in the transmission housing and the original equipment dipstick tube is reinserted into the housing in end-to-end relation with the present dipstick-shielding tube. Thereafter, the original equipment dipstick is replaced providing an accurate fluid level reading.

10 Claims, 4 Drawing Sheets

DIPSTICK-SHIELDING TUBE AND METHOD OF USE

CROSS-REFERENCE TO RELATED APPLICATION

This patent application claims the benefit under 35 U.S.C. 119(e) of U.S. Provisional Patent Application No. 60/473,973 filed May 30, 2003, entitled Dipstick-Shielding Tube and Method of Use.

BACKGROUND OF INVENTION

The present invention relates to automotive transmissions and, more particularly, to a dipstick-shielding tube for use in combination with a dipstick to ensure accurate measurement of the automatic transmission fluid level within the transmission sump of CHRYSLER 41TE (A604) and other similar transmissions.

Automatic transmission systems have a hydraulic control system, which includes hydraulically actuated components for regulating the flow and pressure of automatic transmission fluid (hereinafter "ATF") within the system. Thus, a sufficient volume of ATF is critical to maintaining adequate hydraulic pressure within the system to actuate and lubricate all of the operating components.

In an automotive transmission ATF accumulates by gravitational flow in the fluid sump from which it is continuously drawn by the hydraulic pump. An ATF measuring device or so-called dipstick is typically provided to check ATF level in the sump. The dipstick extends vertically through an elongated dipstick tube into the sump from the exterior of the transmission and is withdrawn manually to provide a visual indication of the ATF level, which is read on the dipstick.

A problem exists in that the continuous return flow and agitation of ATF from within the sump causes splashing of ATF onto the dipstick resulting in inaccurate fluid level readings (i.e. the dipstick reads full when the fluid level is actually low).

Thus, the present invention has been developed to provide a dipstick-shielding tube for use in combination with the dipstick to resolve this problem and other shortcomings of the prior art.

SUMMARY OF THE INVENTION

Accordingly, the present invention is an ATF dipstick-shielding tube and method of use for a CHRYSLER 41TE (A604) transmission (hereinafter "CHRYSLER transmission") and other similar transmissions that physically shields the terminal end of the dipstick whereon fluid level indicia are imprinted from splashing ATF to ensure an accurate fluid level reading.

In a method of the present invention, the original equipment manufacture (hereinafter "OEM") dipstick tube is initially removed from the transmission housing. Next, the present dipstick-shielding tube is inserted in the transmission housing to a predetermined depth and the OEM dipstick tube is reinstalled in end-to-end relation with the present dipstick-shielding tube. Thereafter, the OEM dipstick is replaced therein such that the fluid level indicia are shielded by the present tube to ensure an accurate reading.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1A:
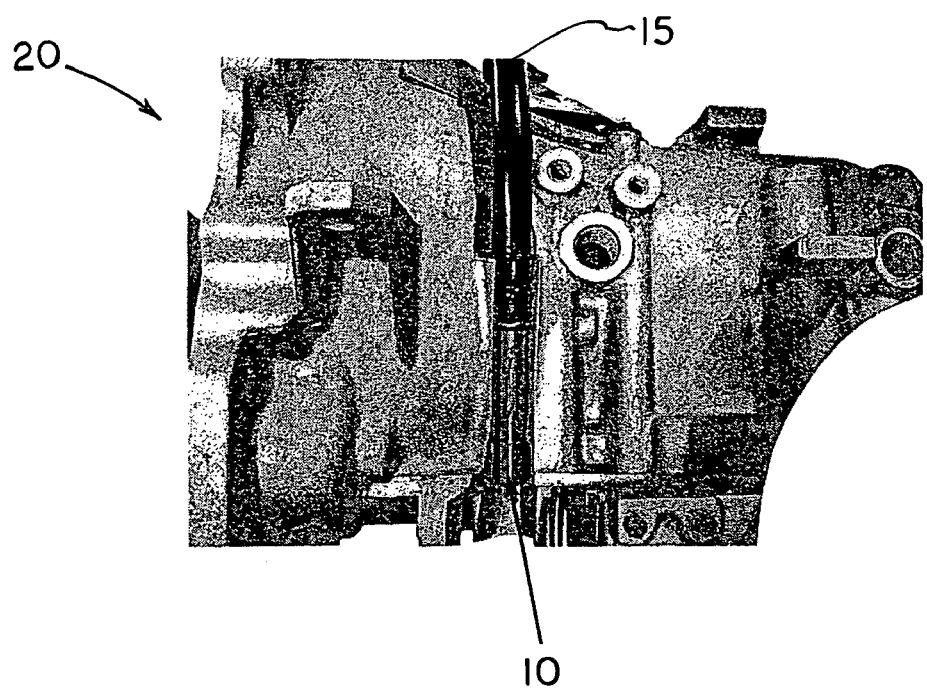
FIG. 1A is a cutaway perspective view of a prior art CHRYSLER transmission housing showing the location of the present dipstick shielding tube.
Figure 1B:
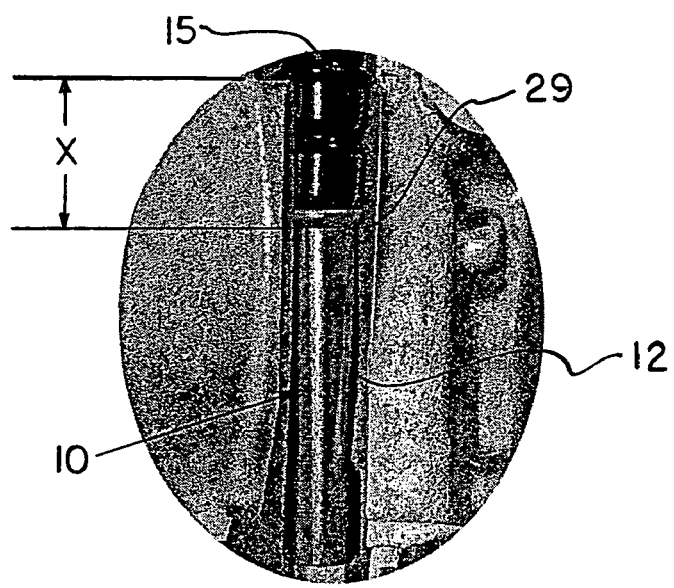
FIG. 1B is an enlarged cutaway perspective view of the CHRYSLER transmission housing of FIG. 1A.

With further reference to the drawings there is shown therein a dipstick-shielding tube in accordance with the present invention, indicated generally at 10 and illustrated in FIG. 1A. The dipstick-shielding tube 10 is shown disposed in its functional position within the transmission housing, indicated generally at 20, which is partially cut away for purposes of clarification. The present dipstick-shielding tube 10 is installed within a vertically oriented passage 12 (shown in cutaway section in FIG. 1B) formed in the housing 20 in end-to-end relation to the OEM dipstick tube 15 as explained hereinafter in further detail.

Figure 2:
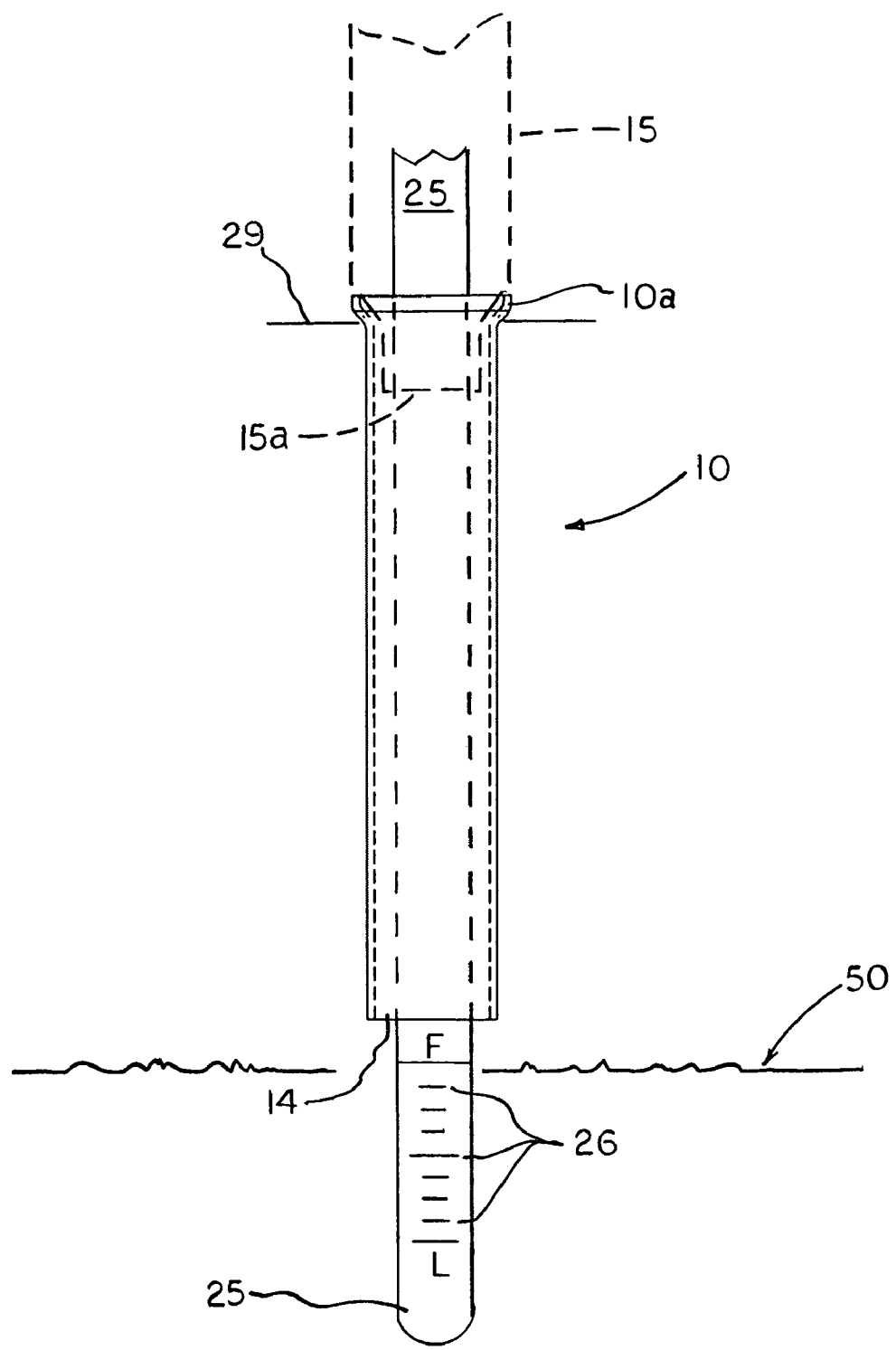
FIG. 2 is an elevational view of the dipstick-shielding tube of the present invention.

Referring now to FIG. 2 the dipstick-shielding tube 10 is an elongated cylindrical construction having a central bore 14 extending its entire length wherein a dipstick 25 having fluid level indicia 26 thereon is disposed. The tube 10 is flared at one end to produce an integral flange 10a. It will be appreciated that the axial length of the dipstick-shielding tube 10 may be adjusted (as hereinafter explained) for a specific transmission application to either partially or completely cover the indicia 26, which typically indicate a fluid level from Full (F) to Low (L) range as shown.

In the preferred embodiment tube 10 is fabricated from low carbon steel tubing in accordance with American Iron and Steel Institute (AISI) 1010-1018 specifications or another suitable material having a wall thickness of approximately 0.035 inches.

In the CHRYSLER 41TE (A604) transmission the present dipstick-shielding tube 10 is utilized to resolve an exemplary problem illustrated in FIG. 3 and hereinafter described. In a factory assembly procedure the OEM dipstick tube 15 (FIG. 2) is inserted into the passage 12 (FIG. 3) to a depth corresponding to dimension "X", wherein a step or shoulder 29 is formed such that the OEM dipstick tube 15 bottoms out against the shoulder 29.

Figure 3:
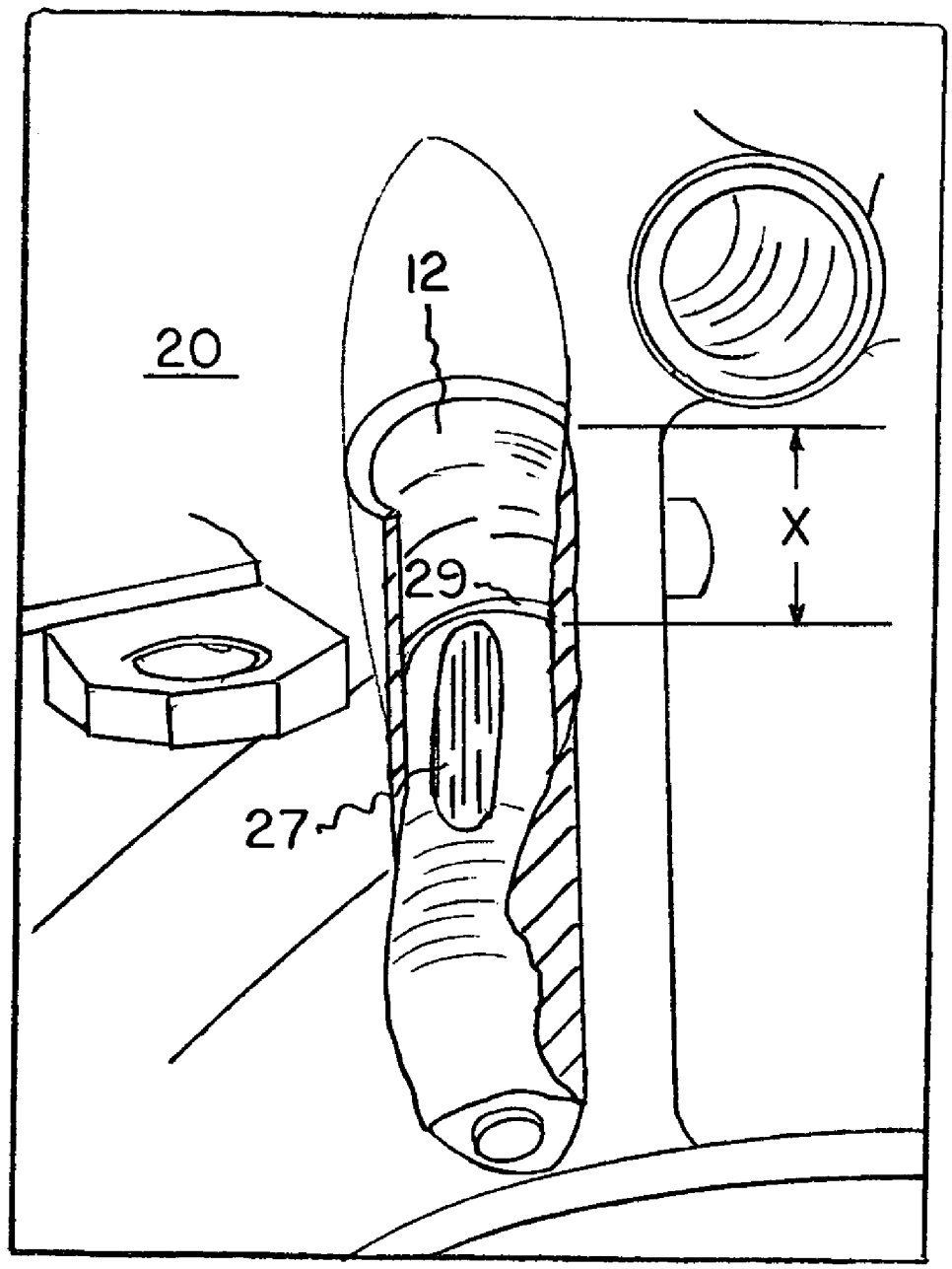
FIG. 3 is an enlarged perspective view of a cutaway section of the CHRYSLER transmission housing wherein the present dipstick-shielding tube resides after installation.

As shown in FIG. 3, the passage 12 intersects with a fluid drain 27, which empties into the passage 12. ATF delivered via fluid drain 27 spills downwardly over the OEM dipstick 25 adhering thereto, which can result in a false reading (i.e. the dipstick reads full when the fluid level is actually low).

Using a method of the present invention to correct this problem, the OEM dipstick tube 15 is initially removed from the transmission housing 20. Next, the present dipstick-shielding tube 10 is inserted into the passage 12 to a depth corresponding to dimension "X", which is approximately 1.125 inches in the CHRYSLER transmission such that the flared end 10a (FIG. 2) of the tube 10 abuts the shoulder 29 (FIG. 3). Thereafter, the terminal end 15a of the OEM dipstick tube 15 is reinserted into the passage 12 and also into the flared end 10a of the present tube 10 in end-to-end relation (see FIG. 2) to secure it in position. Thus, ATF entering the passage 12 via fluid drain 27 is deflected downwardly by the dipstick-shielding tube 10 and into the sump without spilling over the fluid level indicia 26 on the dipstick 25.

The present dipstick-shielding tube 10 is also provided with structures comprising length adjusting means including, but not limited to, the following structures. In the embodiment shown in FIG. 4, the axial length of tube 10' may be increased to provide a universal fit for similar transmissions and other equipment. Thus, tube 10' is provided with detachable segments 40 delineated at regular intervals by annular score lines 45 of a sufficient depth to permit convenient removal of segments 40 to adjust the axial length. Segments 40 are cut or snapped off using a suitable tool such as a tubing cutter or pliers to obtain the desired length.

Using this method tube 10' is rendered adjustable to provide a universal fit with similar automatic transmissions or other machinery such as an internal combustion engine having an oil sump. In such alternative application tube 10' (FIG. 4) is shown enclosing the terminal end 15a of dipstick 15 below the fluid surface as at 50, which may be useful in checking oil level or another fluid level while an engine or other equipment is operating and the fluid is agitated.

Figure 4:
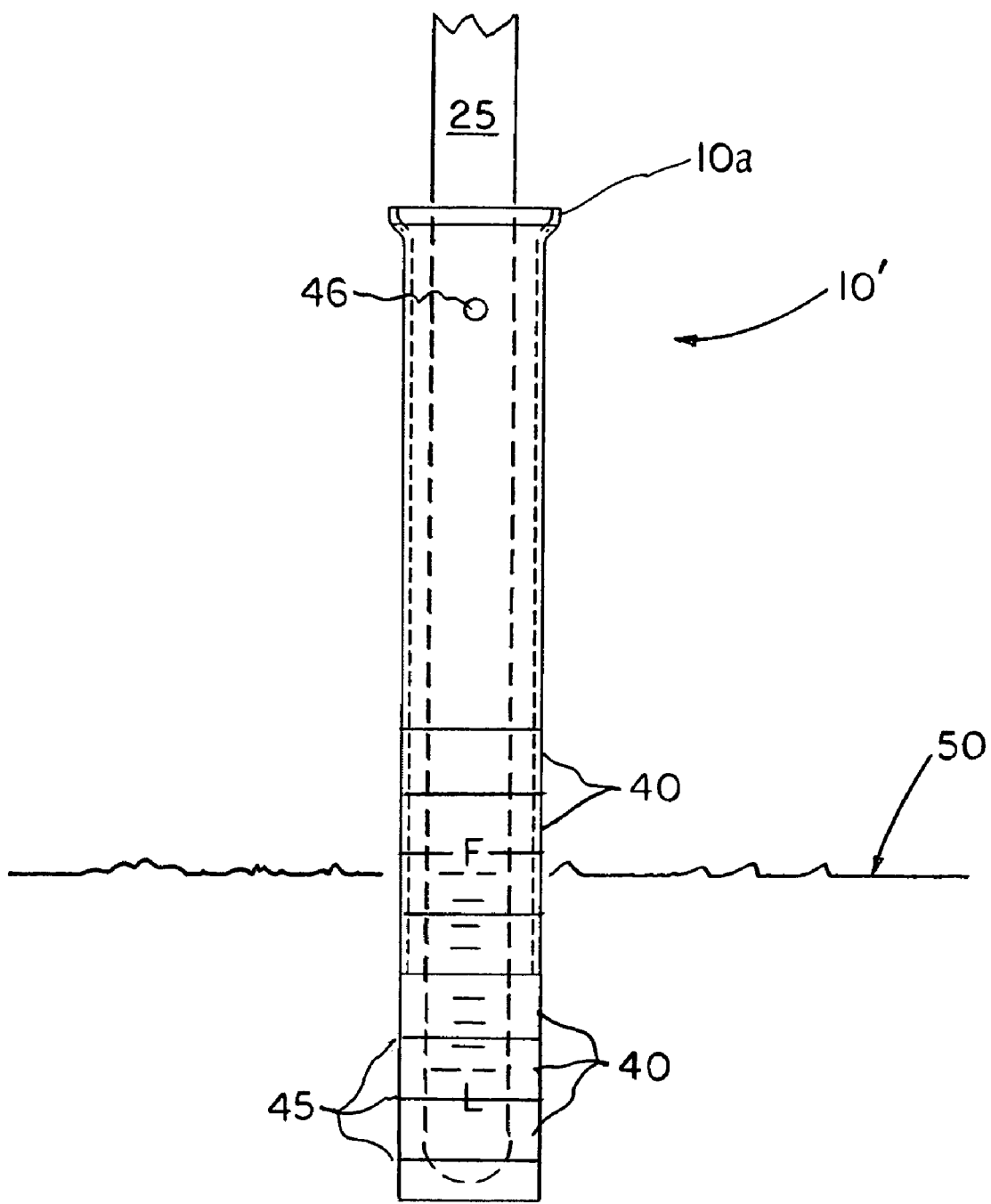
FIG. 4 is an elevational view of another embodiment of the present dipstick-shielding tube.

In the embodiment shown in FIG. 4, the dipstick-shielding tube provides structures comprising venting means including, but not limited to, the following structures. As shown in FIG. 4 a vent hole 46 is provided to equalize pressure within the tube 10' to ensure that the fluid level within tube 10' will rise to the same level as the fluid surface at 50 to the exterior of the tube 10' to provide an accurate fluid level reading. Of course, other venting structures may be devised for this purpose and, thus, the example shown in FIG. 4 is intended to be illustrative and not restrictive in any sense.

Although not specifically illustrated in the drawings, it should be understood that additional equipment and structural components will be provided as necessary and that all of the components described above are arranged and supported in an appropriate fashion to form a complete and operative dipstick-shielding tube incorporating features of the present invention.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Moreover, although illustrative embodiments of the invention have been described, a latitude of modification, change, and substitution is intended in the foregoing disclosure, and in certain instances some features of the invention will be employed without a corresponding use of other features.

What is claimed is:

1. A method of checking automatic transmission fluid level within a fluid sump of an automatic transmission wherein transmission fluid accumulates by gravitational flow, said transmission having a housing whereon said fluid sump is attached in underlying relation, said housing including an original equipment dipstick tube residing in a passage extending from an interior of said housing to an exterior thereof, wherein a dipstick having fluid level indicia thereon is disposed, said dipstick extending through said dipstick tube into said fluid sump to determine said fluid level, said method comprising the steps of:
  removing said dipstick from said original equipment dipstick tube;
  withdrawing said original equipment dipstick tube from said passage within said housing;
  installing a dipstick-shielding tube into said passage such that said dipstick-shielding tube extends into said fluid sump to a predetermined depth;
  reinstalling said original equipment dipstick tube in end-to-end relation with said dipstick-shielding tube; and
  replacing said dipstick within said original equipment dipstick tube and within said dipstick-shielding tube such that said fluid level indicia are shielded from splashing fluid permitting an accurate fluid level to be read on said dipstick.

2. The method of claim 1 wherein the step of installing further includes the step of adjusting said predetermined depth to fit a specific application.

3. The method of claim 2 wherein the step of adjusting is carried out by length adjusting means including a plurality of detachable annular segments formed at regular intervals at a terminal end of said dipstick-shielding tube.

4. A dipstick-shielding tube for use in combination with a dipstick for measuring fluid level in a transmission sump, said dipstick-shielding tube comprising:
  an elongated cylindrical tube having a perpendicular flange member formed at a first end thereof;
  length adjusting means integrally formed in said tube at a second end thereof, said length adjusting means comprising a plurality of detachable annular segments formed at said second end of said tube, wherein said annular segments are of sufficient depth to permit removal of said segments with a suitable tool; and
  venting means integrated within said tube to equalize atmospheric pressure within said tube.

5. A dipstick-shielding tube of claim 4 wherein said dipstick-shielding tube is fabricated from steel tubing having a wall thickness of approximately 0.035 inches.

6. A dip-stick-shielding tube of claim 4 wherein said venting means includes a vent hole formed adjacent said first end of said tube.

7. An improved dipstick assembly for measuring fluid level within an automatic transmission sump, said transmission sump being attached in underlying relation to the transmission housing, said dipstick assembly including a dipstick tube residing in a passage in fluid communication with said sump wherein a dipstick having fluid level indicia thereon is disposed, said dipstick extending through said dipstick tube into said sump to measure said fluid level, wherein the improvement comprises:
  a dipstick-shielding tube disposed within said passage intermediate said dipstick tube and said sump such that said fluid level indicia are shielded from splashing fluid enabling an accurate fluid level reading on said dipstick, wherein said dipstick-shielding tube includes length adjusting means integrally formed in said dipstick-shielding tube at a terminal end thereof.

8. The improved dipstick assembly of claim 7 wherein said length adjusting means comprises a plurality of detachable annular segments delineated by score lines of sufficient depth to permit manual removal of said annular segments with a suitable tool.

9. The improved dipstick assembly of claim 8 wherein said dipstick-shielding tube is fabricated from steel tubing material having a wall thickness of approximately 0.035 inches.

10. The improved dipstick assembly of claim 8 wherein said dipstick-shielding tube further includes venting means for equalizing atmospheric pressure within said tube.

* * * * *